No. 710,878. Patented Oct. 7, 1902.
W. MILLER.
HARVESTER REEL.
(Application filed Jan. 20, 1902.)
(No Model.)
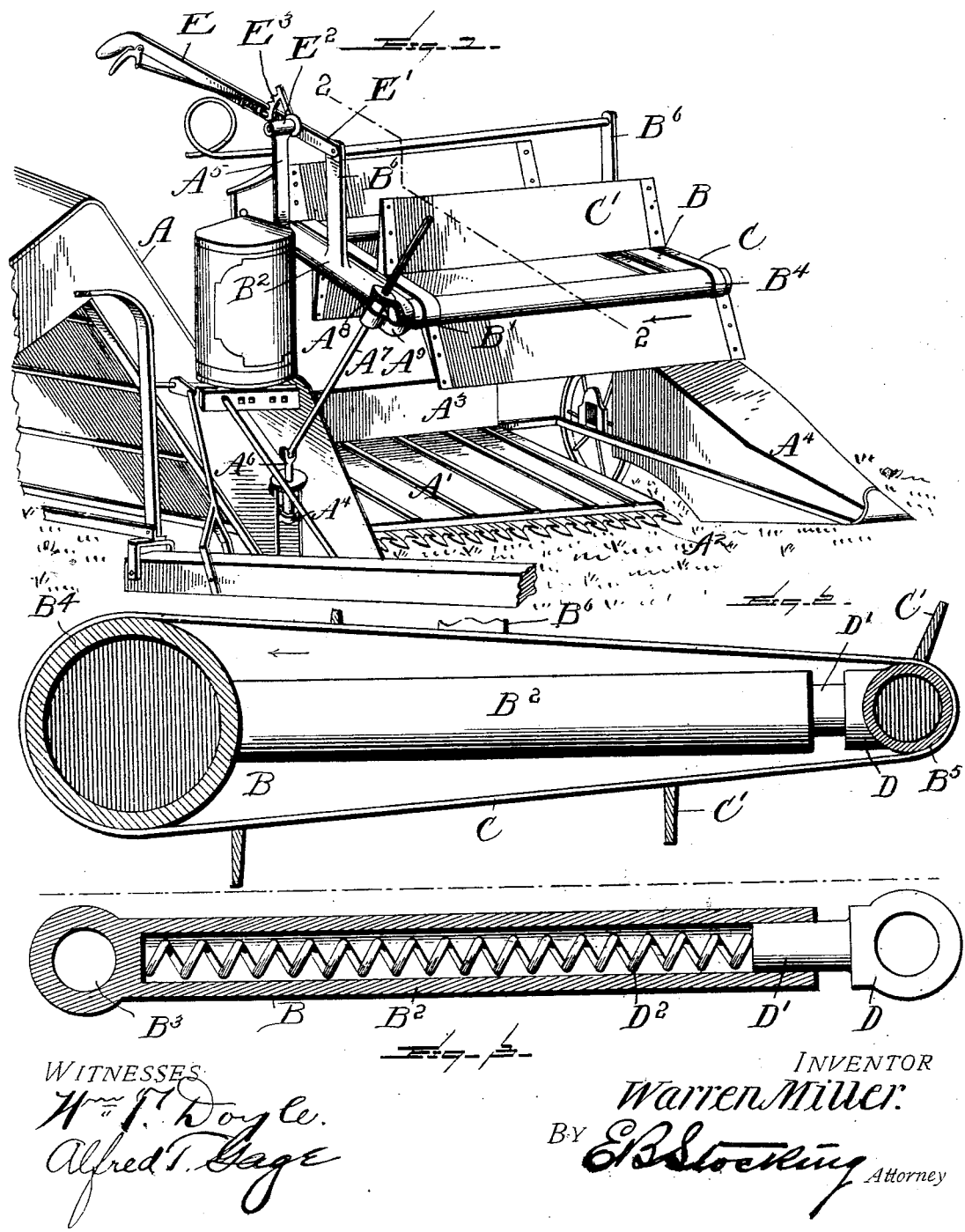
WITNESSES
Wm T. Doyle.
Alfred T. Gage
INVENTOR
Warren Miller.
BY E. B. Stocking, Attorney

UNITED STATES PATENT OFFICE.

WARREN MILLER, OF MURPHYSBORO, ILLINOIS.

HARVESTER-REEL.

SPECIFICATION forming part of Letters Patent No. 710,878, dated October 7, 1902.

Application filed January 20, 1902. Serial No. 90,450. (No model.)

*To all whom it may concern:*

Be it known that I, WARREN MILLER, a citizen of the United States, residing at Murphysboro, in the county of Jackson, State of Illinois, have invented certain new and useful Improvements in Harvester-Reels, of which the following is a specification, reference being had therein to the accompanying drawings.

This invention relates to harvester-reels, and particularly to an improved construction of endless carrier adapted to perform the functions of an ordinary wheel form of reel.

The invention has for its object to provide an improved construction of the endless carrier whereby the bearing-rolls therefor are retained under the proper tension to secure the driving of the blades and paddles carried thereby.

A further object of the invention is to so locate this carrier as to obtain the most desirable feeding action onto the carrier-belt of the harvester, involving the disposition of a large driving-roll at the front of the reel-carrier, so as to permit the paddles to approach more closely to the harvester-apron at the cutter edge thereof and to gradually recede therefrom.

Other and further objects and advantages of the invention will be hereinafter set forth, and the novel features thereof defined by the appended claims.

In the drawings, Figure 1 is a perspective showing the application of the invention to the harvesting-machine. Fig. 2 is a longitudinal section through the reel-carrier on the line 2 2 of Fig. 1, and Fig. 3 is a similar section through one of the reels for supporting the carrier.

Like letters of reference refer to like parts throughout the several figures of the drawings.

The invention is adapted for application to any form of harvester or similar machine, but is herein shown in relation to a self-binding harvester (indicated at A) and provided with a carrier-apron A', having at one side thereof a series of cutters $A^2$ and at the opposite side a stop-board $A^3$. At the edges of the carrier-apron A' grain-gatherers $A^4$ are provided, and a supporting-standard $A^5$ extends upward above the apron A' to form a support for the reel-frame B, which may be driven from any suitable source of power—for instance, by means of an ordinary driving connection, (shown at $A^6$,) having the driving-rod $A^7$, splined to a gear $A^8$, carried by the reel and adapted to slide on said rod in the adjustment of the reel-carrier and to mesh with a gear B' thereon.

The frame B is principally composed of the tubular or cylindrical hollow sections $B^2$, provided at one end with a fixed journal-box $B^3$, adapted to receive the main driving-roll $B^4$, over which the belt C or equivalent means of the reel-carrier passes. At the opposite end of the bars $B^2$ a slidable bearing D is mounted within the tubular portion by means of a shank D' fitting said portion, while this slidable bearing is normally forced away from the fixed bearing by means of a coiled spring $D^2$, disposed within the hollow tubular side bars $B^2$ and serving to retain the belt under an even and equal tension at all times. The carrier means C is provided with a series of blades or paddles C', extending from the surface thereof and adapted in their movement to carry the grain from the cutters $A^2$ onto the apron A'. Within the sliding journal-box D a roller $B^5$ is suitably mounted and is of less diameter than the driving-roll $B^4$, so that the carrier-belt C travels in an inclined direction to the horizontal, as represented by the dotted line in Fig. 2, which is in the relative position of the apron-carrier of the harvesting-machine.

For the purpose of supporting and adjusting the reel in relation to the carrier-apron A' the side bars $B^2$ are provided with standards $B^6$, pivotally connected at their upper ends to the end E' of an adjusting-lever E, which ordinarily is pivotally supported upon the standard $A^5$, as shown at $E^2$, while it may be held in its adjusted position by means of the ordinary latch $E^3$. In the adjustment of the reel the same may be raised or lowered relative to the surface of the carrier-apron A', and during such adjustment the gearing $A^8$ will travel upon the rod $A^7$, to which it is splined, and continue to apply the necessary power for driving the reel-belt. For the purpose of thus supporting the gear $A^8$ a journal-boxing $A^9$ is secured to the side bar $B^2$ of the reel.

The operation of the invention will be clearly understood from the foregoing description, and it will be noted that this form of reel will obviate the danger of breakage from contact with trees and other objects frequently experienced with the large wheel-reels, while it performs all of the functions of such reels and runs much lighter. It also offers less resistance to the air in the movement of the machine, and owing to its low position relative to the carrier-apron could be used in orchards, so as to pass beneath the limbs of the trees. It is also capable of being constructed of strong material, so as to withstand all usual strains in order to efficiently perform its functions. It will be noted that the use of the enlarged bearing at the front of the machine gives the necessary power for driving the belt or carrier, while it also causes the blades or paddles to move more slowly in making the turn with the carrier, which is important, as they should closely approach the carrier-apron at the front end and gradually recede therefrom in their rearward movement, as indicated by the dotted horizontal line in Fig. 2.

It will be obvious that changes may be made in the details of construction and configuration in the several parts without departing from the spirit of the invention as defined by the appended claims.

Having described my invention and set forth its merits, what I claim, and desire to secure by Letters Patent, is—

1. In a harvester-reel, a carrier-apron, a supporting-frame suspended in a horizontal plane above said apron and having at its outer end a bearing-roll and at its inner end a smaller bearing-roll, a carrier movable over said rolls transversely of the apron, paddles carried by said carrier, and means for adjusting said carrier toward and from said apron, substantially as specified.

2. The combination, with a harvester carrier-apron, of a harvester-reel comprising opposite tubular frames suspended above said apron each having a fixed bearing at one end and open at the opposite end, slidable bearings having shanks adapted to fit within the open ends of said frames, independent coiled springs disposed within each of said frames and bearing upon said shanks, bearing-rollers mounted in said bearings and connecting the ends of the frame, a carrier mounted upon said rollers, to travel at an angle to said apron and paddles carried by said carrier; substantially as specified.

In testimony whereof I affix my signature in presence of two witnesses.

WARREN MILLER.

Witnesses:
 ISAAC DEASON,
 JOSEPH KIMMEL.